United States Patent
Bauer et al.

(10) Patent No.: US 6,710,470 B2
(45) Date of Patent: Mar. 23, 2004

(54) DEVICE FOR THE WIRELESS TRANSMISSION OF A TRIPPING SIGNAL FOR A RESTRAINT SYSTEM

(75) Inventors: Joachim Bauer, Oberstenfeld-Prevorst (DE); Peter Bolz, Markgroeningen (DE); Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 09/955,108

(22) Filed: Sep. 19, 2001

(65) Prior Publication Data

US 2002/0074860 A1 Jun. 20, 2002

(30) Foreign Application Priority Data

Sep. 21, 2000 (DE) .......................... 100 46 700

(51) Int. Cl.$^7$ ................................. H02G 3/00
(52) U.S. Cl. ....................... 307/10.1; 307/9.1
(58) Field of Search ................... 307/9.1, 10.1; 439/15; 340/428

(56) References Cited

U.S. PATENT DOCUMENTS

| | | | | |
|---|---|---|---|---|
| RE33,692 E | * | 9/1991 | Hirano et al. | 324/534 |
| 6,012,736 A | * | 1/2000 | Hansen et al. | 280/735 |
| 6,091,779 A | * | 7/2000 | Griessbach | 375/258 |
| 6,177,796 B1 | * | 1/2001 | Viti | 324/314 |
| 6,301,977 B1 | * | 10/2001 | Stojanovski | 73/862.393 |

FOREIGN PATENT DOCUMENTS

| | | |
|---|---|---|
| DE | 198 29 730 | 1/1998 |
| DE | 197 53 467 | 8/1999 |
| EP | 0 679 554 | 11/1995 |

* cited by examiner

*Primary Examiner*—Brian Sircus
*Assistant Examiner*—Robert L DeBeradinis
(74) *Attorney, Agent, or Firm*—Kenyon & Kenyon

(57) ABSTRACT

A device for the wireless transmission of a tripping signal for a restraint system, a firing command from a firing bus being converted by a filter into a firing signal, which can be transmitted via an inductive or capacitative transformer. On the secondary side of the transformer, a regeneration device is arranged, which reconstitutes from the firing signal a firing command, which then is used to trigger a restraint system. The restraint system can be connected to a bus simulation, so that the driving electronics for the restraint system are the same as those which are connected directly to the firing bus.

10 Claims, 3 Drawing Sheets

DEVICE FOR THE WIRELESS TRANSMISSION OF A TRIPPING SIGNAL FOR A RESTRAINT SYSTEM

FIELD OF THE INVENTION

The present invention relates to a device for the wireless transmission of a tripping (triggering) signal for a restraint system.

BACKGROUND INFORMATION

In German Published Patent Application No. 198 29 730 is discussed a device which couples electrical elements in the steering wheel and in the steering wheel column of a motor vehicle via a magnetic transformer. Processors designed for data transmission over the transformer are positioned both on the primary as well as on the secondary side of the transformer. Furthermore, elements are provided which make possible a transmission of energy (power) via the transformer.

In German Published Patent Application No. 197 53 467 is discussed a circuit for data and energy transmission in a motor vehicle. Firing commands are wirelessly transmitted via a transformer from a firing bus to firing means, a modulator being used for this purpose. On the secondary side, the transmitted signals are evaluated, and, in the event of a firing command, the control circuit then drives firing circuits. European Published Patent Application No. 0 679 554 discusses that a tripping signal is transmittable from a steering column to the steering wheel. Here, too, a signal evaluation is performed on the steering-wheel side, the secondary side, that is. The signal evaluation then drives restraining means, if appropriate.

SUMMARY OF THE INVENTION

The exemplary device according to the present invention for the wireless transmission of a tripping signal for a restraint system is believed to have the advantage that no additional delays should occur in the transmission of tripping commands as a result of conversions, interpretations, or any other electronic processing, so that the tripping signal may be transmitted to the restraint system via the transformer without buffer storage. In this way, the safety of vehicle occupants may be increased because, the restraint system can react more rapidly to tripping commands.

It is believed to be advantageous that the tripping device includes a bus simulation so as to be able to use the same tripping commands for the firing and tripping circuits to be driven, as are used for the restraining systems that are directly connected to the bus, in this case, the firing bus. In this manner, all restraining systems used in a vehicle may be equipped with the same tripping devices in accordance with their function. This results in a simplification of the installation and the conception of the tripping devices.

It is also believed to be advantageous that a transmission path that heretofore has not been suitable for firing bus signals, namely the transformer, is now nevertheless used for transmitting firing signals, i.e., tripping signals. In this context, a simple electrical filtering is used to form a tripping signal from the tripping command, a direct component being removed. The firing or tripping signal can then be transmitted via the transformer. Other possibilities for detecting the tripping command on the firing bus are to compare the amplitude swing of the firing signal to a reference amplitude and to use the push-pull operation, standard in a tripping command, in comparison with other signals transmitted on the bus. For this purpose, it may be advantageous to use comparators and edge-triggered gates.

It is believed to be particularly advantageous to use a filter having a simple high pass and, if appropriate, also an amplifier or driver, so that a rapid conversion of the tripping command into the tripping signal may be assured using the filter. This should ensure a very "simple" design of the filter.

Furthermore, it is believed to be advantageous that, in addition to the tripping signals, diagnostic and/or control signals may also be transmitted via the transformer.

It is also believed to be advantageous, that on the primary side, a modulator is provided and on the secondary side a demodulator, to modulate the tripping signals to be transmitted via the transformer such that an improved transmission via the transformer is made possible. This is achieved, for example, by a frequency conversion. The demodulator determines the tripping signal from the signals that have been modulated via the transformer.

It is also believed to be advantageous if the tripping device has at least one firing circuit for at least one airbag and/or tripping circuit for belt tighteners, the tripping device being arranged either in a vehicle seat or in a steering wheel.

Furthermore, it is believed to be advantageous if the transformer is configured so as to be either inductive or capacitative, so that in accordance with the installation, the more appropriate transmission principle can be applied.

It is also believed to be advantageous if the tripping device has a bus simulation, so as to use the same tripping commands for the firing circuits to be driven and the tripping circuits as for the restraint systems, which are directly connected to the bus, here to the firing bus. In this manner, all of the restraint systems used in the vehicle are equipped with the same tripping devices in accordance with their function. This should result in a simplification of the installation and conception of the tripping devices.

Finally, it is also believed to be advantageous that a common housing is provided for the electrical elements on the primary side of the transformer, the control unit for the restraint system also being integrated in the housing, so that a separate housing may not be required.

DETAILED DESCRIPTION

It is believed that restraint systems, i.e., especially airbags but belt tighteners, as well, are being increasingly used and in ever greater numbers in motor vehicles, and that this applies especially to the steering wheel and the vehicle seats, the electronics used for the transmitting and processing of tripping signal then being transmitted by wireless transmission. However, the tripping commands, as well as the firing commands may not be directly transmittable via a transformer, because they have a direct component. These tripping or firing commands are transmitted via a firing bus, to which the restraint systems are connected. On the firing bus, the tripping commands are transmitted that have a higher frequency than other signals, for example, diagnostic signals. This allows for discrimination. A further difference between the tripping commands and the other signals lies in the swing, which the tripping commands make use of for the amplitude modulation. Because in tripping commands the amplitude in a push-pull operation, i.e., opposed in equal values, is changed on both lines of the firing bus, which allows for detecting the tripping command. For this purpose, for example, edge-triggered gates and comparators can be used.

According to the exemplary embodiments of the present invention, therefore, on a primary side of the transformer a filter is provided which from the tripping command forms a tripping signal, which can be transmitted via the transformer. The tripping signal is then once again converted on the secondary side by a regeneration device into a tripping command, so as then to be able to be transmitted to a tripping device for the restraint system. The filter is configured as a high pass in the simplest possible form.

In addition to tripping signals, diagnosis and control signals can also be transmitted via the transformer, the tripping signal being superimposed upon these diagnosis and control signals. In addition, a modulator can also be provided for modulating the tripping signal, and a demodulator can be provided for demodulating the tripping signal, so that the tripping signal is modulated such that an improved transmission via the transformer is assured. This is realized through a frequency conversion. The tripping device can in particular have a bus simulation, the bus simulation corresponding to the firing bus that is connected to the primary side of the transformer, so that the same tripping device is also provided for the restraint system on the secondary side as for those restraint systems that are connected directly to the bus.

Figure 1:
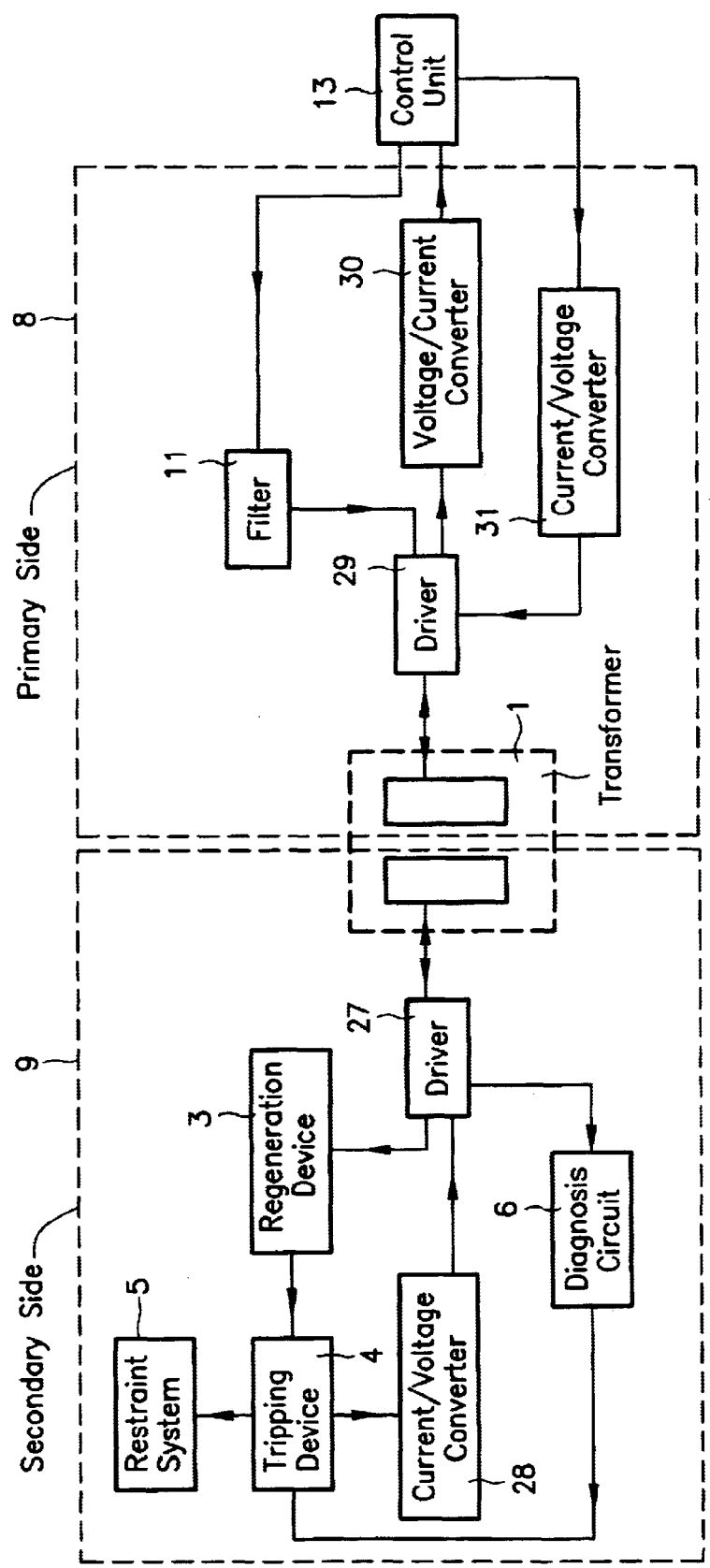
FIG. 1 shows a first exemplary embodiment of the device according to the present invention.

In FIG. 1, a first exemplary embodiment of the device according to the present invention is depicted as a block diagram. A transformer 1 connects a primary side 8 and a secondary side 9. Primary side 8 has a filter 11, a driver 29, a voltage/current converter 30 for diagnosis signals, and a current/voltage converter 31 for the diagnosis and control signals, whereas secondary side 9 has a driver 27, a regeneration device 3, a tripping device 4, a restraint system 5, a diagnosis circuit 6, and a current/voltage converter 28.

Filter 11 is connected via its output to driver 29. To an input of filter 11, a first output of a control unit 13 is connected. An input of control unit 13 is connected to voltage/current converter 30. An input of voltage/current converter 30 is connected to an output of driver 29. A second output of control unit 13 is connected to current/voltage converter 31. An output of current voltage converter 31 is connected to driver 29. Driver 29 is connected via an input-output to transformer 1.

Driver 27 is connected via an input-output to transformer 1. Via a first output, driver 27 is connected to regeneration device 3 for the trigger command. Via a second output, driver 27 is connected to a diagnosis circuit 6 as a voltage/current converter. An input of driver 27 is connected to a current/voltage converter 28. Regeneration device 3 is connected via its output to tripping device 4. Tripping device 4 is connected via its first output to restraint system 5 and via its second output to current/voltage converter 28. A second input of tripping device 4 is connected to diagnosis circuit 6.

Control unit 13 transmits the tripping command to filter 11. The tripping command has a direct component, which as is well known cannot be transmitted via transformer 1. Therefore, filter 11 removes this direct component in order to generate a tripping signal that can be transmitted via transformer 1. In addition, filter 11 separates the tripping command from diagnosis signals that can also be present at filter 11. The tripping command is transmitted at a higher transmission rate than the diagnosis signals, so that the tripping command can be separated from the diagnosis signals by filter 11. Further possibilities for the separation are offered by the amplitude swing and by the fact that the tripping command is generated by a push-pull signal, whereas in the case of diagnosis signals only the signal on one line is modulated with respect to amplitude. For this purpose, appropriate discriminators can then be used.

The tripping signal generated by filter 11 is then conveyed to driver 29, which carries out a signal amplification. Driver 29 has a means to amplify signals from transformer 1 and signals for transformer 1. The tripping signal then arrives via transformer 1 at driver 27 on secondary side 9. Driver 27 also carries out a signal amplification. The tripping signal is superimposed on the diagnosis and control signals, which are also transmitted via transformer 1. The tripping signal is then further processed only by regeneration device 3, regeneration device 3 once again adding a direct component in order thus to reconstitute the tripping command. The tripping command then arrives at tripping device 4, which on the basis of the tripping command triggers restraint system 4. The recreation of the tripping command has the advantage that tripping device 4 can be configured exactly as if tripping device 4 is connected via a firing bus to control unit 13.

In addition to the tripping signal, the control and diagnosis signals are also transmitted via transformer 1. The diagnosis signals for transmission via transformer 1 are in each case converted by current/voltage converters 28 and 31 into voltage signals, whereas after a transmission via transformer 1 voltage/current converter 6 and 30 once again deliver current signals as the output signals. The diagnosis signals are generated in a current-modulated form and are provided to monitor the resistance of firing pellets, transistors of the tripping circuit, and energy reserves for the tripping and to communicate this to control unit 13.

Figure 2:
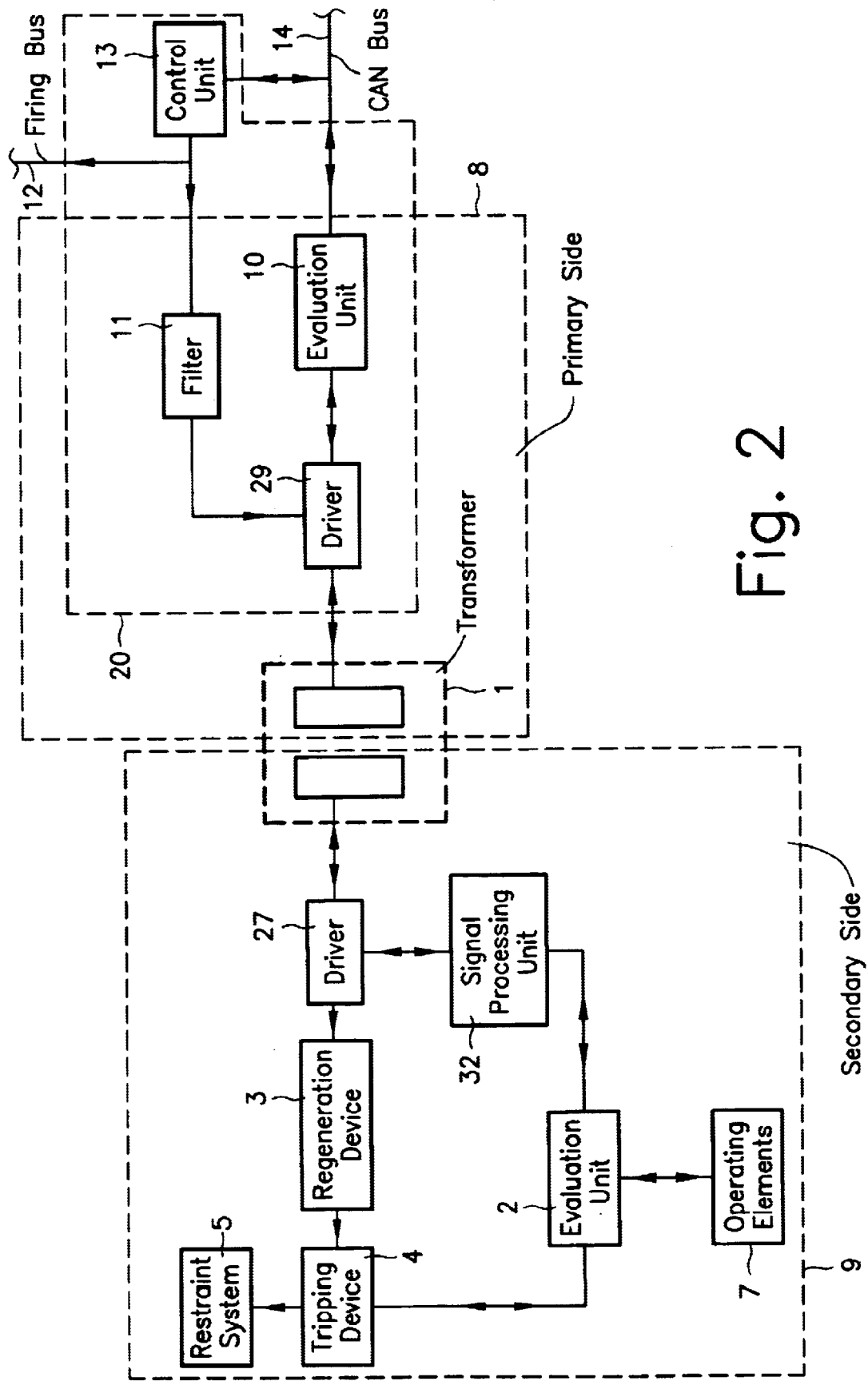
FIG. 2 shows a second exemplary embodiment of the device according to the present invention.

In FIG. 2, a second exemplary embodiment of the device according to the present invention is depicted. Transformer 1 connects primary side 8 and secondary side 9. Primary side 8 has driver 29, filter 11, and an evaluation unit 10. Secondary side 9 has driver 27, a signal processing unit 32, an evaluation unit 2, operating elements 7, tripping device 4, regeneration device 3, and restraint system 5.

Control unit 13 is connected via a firing bus 12 to filter 11. Filter 11 in turn is connected to the input of driver 29. Control unit 13 is connected via a data input-output to a bus 14, here the CAN (Control Area Network) bus. CAN bus 14 is also connected to evaluation unit 10, which here is a microcontroller. Evaluation unit 10 is connected via its second data input-output to a driver 29. Driver 29 is connected via an input-output to transformer 1. On the secondary side, transformer 1 is connected to driver 27. Via an input-output, driver 27 is connected to signal processing device 32, which in turn is connected to evaluation unit 2, which here is also a microcontroller. Driver 27 is connected via an output to regeneration device 3. Evaluation unit 2 is connected via a second data input-output to operating elements 7. Instead of or in addition to operating elements 7, transformers and sensors are also possible. Via a data input-output, evaluation unit 2 is connected to tripping device 4. Tripping device 4 is connected via an output to restraint system 5 and via an input to regeneration device 3.

The processing of the trigger command is as described for FIG. 1. The diagnosis signals, however, are here transmitted by and to control unit 13 via CAN bus 14. In this context, the diagnosis signals are conveyed via evaluation units 2 and 10. Further restraint systems can be connected to firing bus 12.

Evaluation unit 2 here is also a processor, but it is possible that here as well an application-oriented, integrated circuit, i.e., an ASIC be used, which also applies for filter 11 and regeneration device 3. Examples of operating elements 7 are push buttons and/or rollers, whose actuation is converted into digitized commands by an associated electronics which are transmitted by processor 2 via transformer 1 and processor 10 to CAN bus 14. Using the diagnosis signals, which are transmitted from control unit 13 to restraint system 5 via a processor 10, transformer 1, processor 2, diagnosis circuit 6, and tripping device 4, it is established whether restraint system 5 is still in proper service condition. For this purpose, for example, the resistance in the firing circuits or the use of signals on restraint system 5 is measured and tested.

If control unit 13 using associated sensors registers a vehicle impact, then control unit 13 transmits via firing bus 12 a firing command, i.e., a tripping command. This firing command has the direct component removed by filter 11, which is configured as a high pass, so that the remaining alternating component can be transmitted via transformer 1. The tripping signal is superimposed on the signals coming from processor 10. The tripping signal is recognized by regeneration device 3, and the latter reconstitutes from the tripping signal a complete tripping command, in which a corresponding direct component is added to the transmitted alternating component. This tripping command is then transmitted to tripping device 4, which thus triggers restraint system 5.

Figure 3:
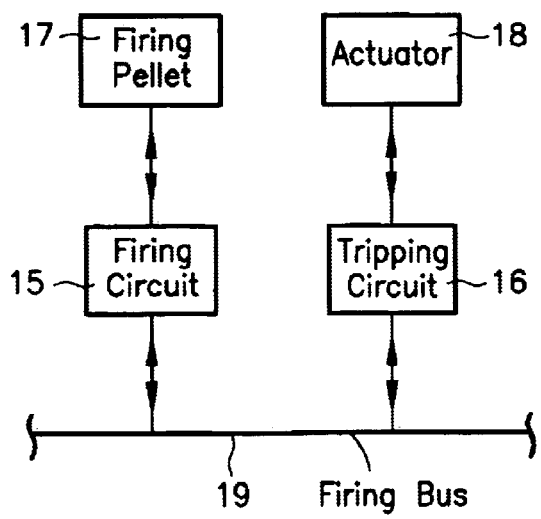
FIG. 3 shows an exemplary embodiment of the tripping device.

In FIG. 3, an exemplary embodiment of tripping device 4 is depicted. Tripping device 4 has a simulated firing bus 19, via which the reconstituted tripping command is transmitted, and specifically to a firing circuit 15 and to a tripping circuit 16 for a belt tightener. Firing circuit 15 is for an airbag and therefore firing circuit 15 is connected to a firing pellet 17, to fire the latter in response to a tripping command. Alternatively, there may be a plurality of firing circuits, which are driven by tripping circuit 16.

Tripping circuit 16, on the other hand, is connected to an actor technology (actuator) 18, which, in response to the reception of the tripping command, actuates the belt tightener. Here also, a plurality of actuators may be driven by tripping circuit 16.

Alternatively, a firing bus on the secondary side can be dispensed with, so that the tripping command is transmitted directly to tripping circuit 16.

Figure 4:
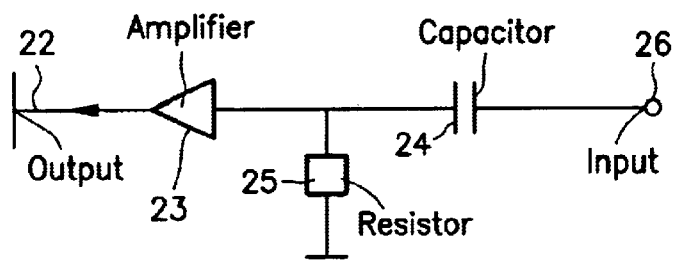
FIG. 4 shows an exemplary embodiment of the regeneration device.

FIG. 4 depicts the manner in which filter 11 is configured. Via an input 26, filter 11 receives the tripping command. Resistor 25 and a capacitor 24 constitute a high pass, to which the tripping command is conveyed, to eliminate the direct component from the tripping command and to separate from the diagnosis signals the tripping signal, which has arisen in this manner. Therefore, capacitor 24 is connected to input 26 and, on the other side, to the resistor and to an input of an amplifier 23, whereas the other side of resistor 25 is connected to ground. Amplifier 23 is provided in order to amplify the tripping signal. The output of amplifier 23 leads to an output 22, which is connected to driver 29.

Figure 5:
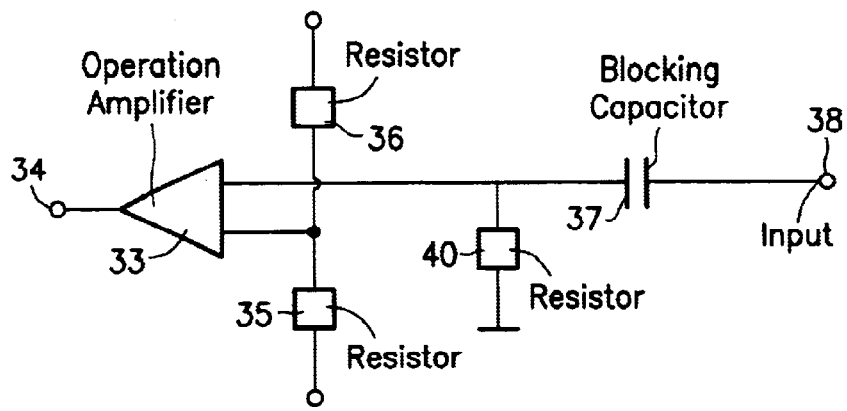
FIG. 5 shows a block diagram of the exemplary filter according to the present invention.

In FIG. 5, an exemplary embodiment of regeneration device 3 is depicted. An input 38 of regeneration device 3 is connected to a blocking capacitor 37, which is designed to keep out undesirable direct components. On the other side, blocking capacitor 37, which can also optionally be dispensed with, is connected to a first input of an operation amplifier 33 and to a resistor 40. Resistor 40 on the other side is connected to ground. Resistors 35 and 36 are connected to a second input of operation amplifier 33. Resistor 35, at its other side, is connected to ground, whereas resistor 36 at its other side is connected to a direct voltage source. Using operation amplifier 33, the tripping signal has added to it a direct component, which results from the voltage value of the direct voltage source. In this way, the tripping command is generated once again.

The tripping signal may also be subjected to a frequency conversion, so that the tripping signal can be transmitted via transformer 1 at higher frequency. The modulator then is configured as a voltage/frequency converter, whereas the modulator is a frequency/voltage converter. For example, a phase-locked loop (PLL) may be used both as modulator and as modulator.

What is claimed is:

1. A device for wirelessly transmitting a tripping signal for a restraint system, the device comprising:
   - a transformer for providing wireless transmission, and having a secondary side that is connectable to a tripping device and to at least one restraint system;
   - a filter; and
   - a regeneration device;
   wherein:
   - at a primary side of the transformer, a bus is connectable via the filter, the filter being operable to filter out the tripping signal from a tripping command from the bus,
   - the transformer is operable to transmit the tripping signal from the primary side to the secondary side,
   - at the secondary side of the transformer, the regeneration device for regenerating the tripping command from the tripping signal is connectable to the tripping device; and
   - the tripping device includes a bus simulation, to which at least one of at least one firing circuit and at least one tripping circuit are connectable.

2. The device of claim 1, wherein the filter includes a high pass filter.

3. The device of claim 1, wherein the filter includes at least one capacitor.

4. The device of claim 1, wherein at least one of a diagnosis signal and a control signal is transmittable via the transformer using a first evaluation unit on the primary side and a second evaluation unit on the secondary side.

5. The device of claim 1, wherein a modulator is arranged on the primary side for modulating the tripping signal, and a demodulator is arranged on the secondary side for demodulating the tripping signal.

6. The device of claim 1, wherein the tripping device includes at least one firing circuit for at least one airbag that is driven by the tripping command.

7. The device of claim 1, wherein the tripping device is connectable to at least one tripping circuit for at least one belt tightener.

8. The device of claim 1, wherein the transformer is configured as one of an inductive transformer and a capacitative transformer.

9. The device of claim 1, wherein the primary side of the transformer is arranged in one of a steering wheel column and a vehicle floor, and the secondary side of the transformer is arranged in one of the steering wheel and a vehicle seat.

10. The device of claim 1, wherein the filter, the bus, a first evaluation unit, and a control unit for the restraint system are installable in one housing.

* * * * *

UNITED STATES PATENT AND TRADEMARK OFFICE
CERTIFICATE OF CORRECTION

PATENT NO. : 6,710,470 B2
DATED : March 23, 2004
INVENTOR(S) : Joachim Bauer et al.

It is certified that error appears in the above-identified patent and that said Letters Patent is hereby corrected as shown below:

Column 6,
Line 16, change "as modulator." to -- as converter --.

Signed and Sealed this

Second Day of November, 2004

JON W. DUDAS
*Director of the United States Patent and Trademark Office*